Patented July 14, 1931

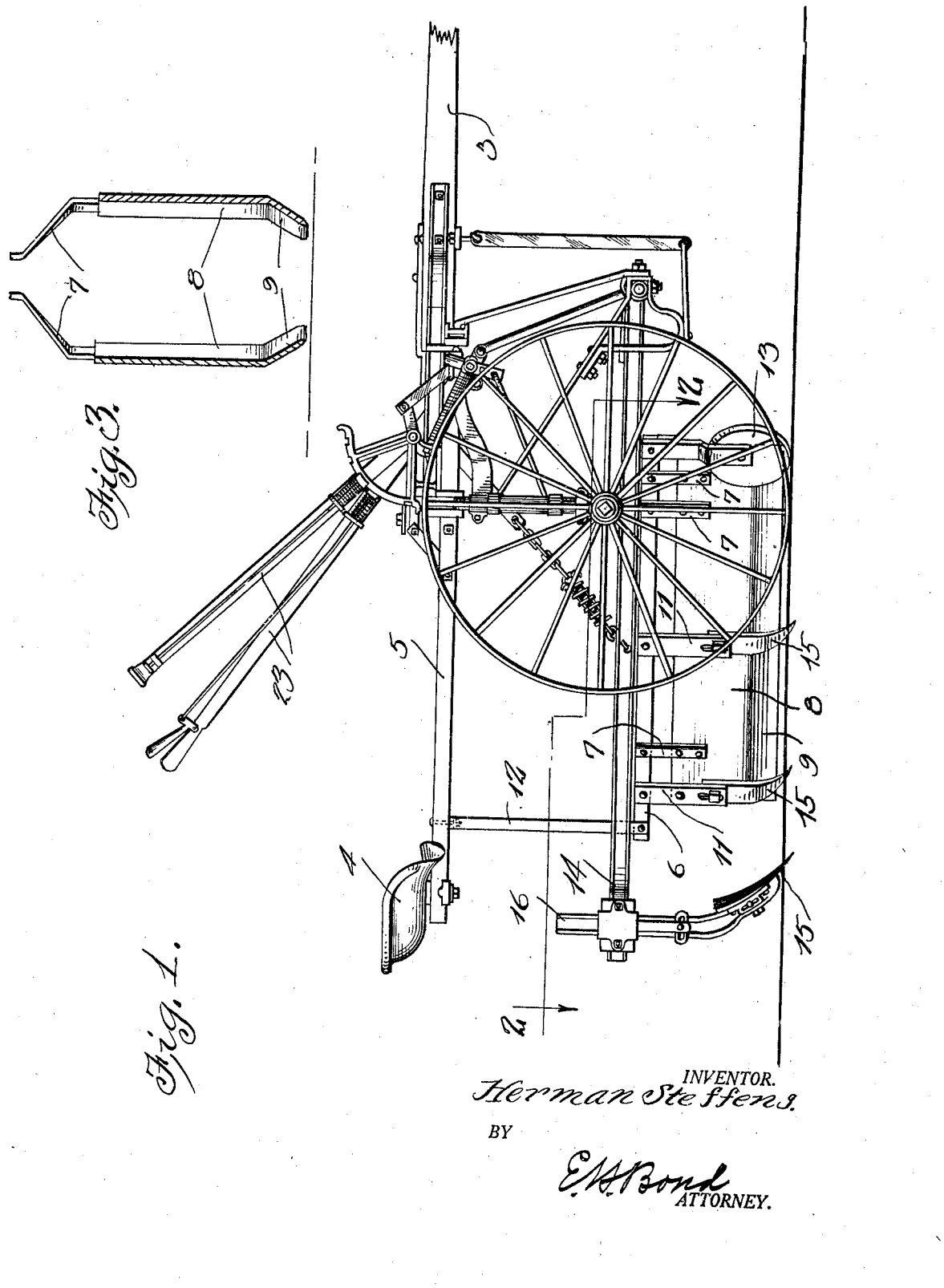

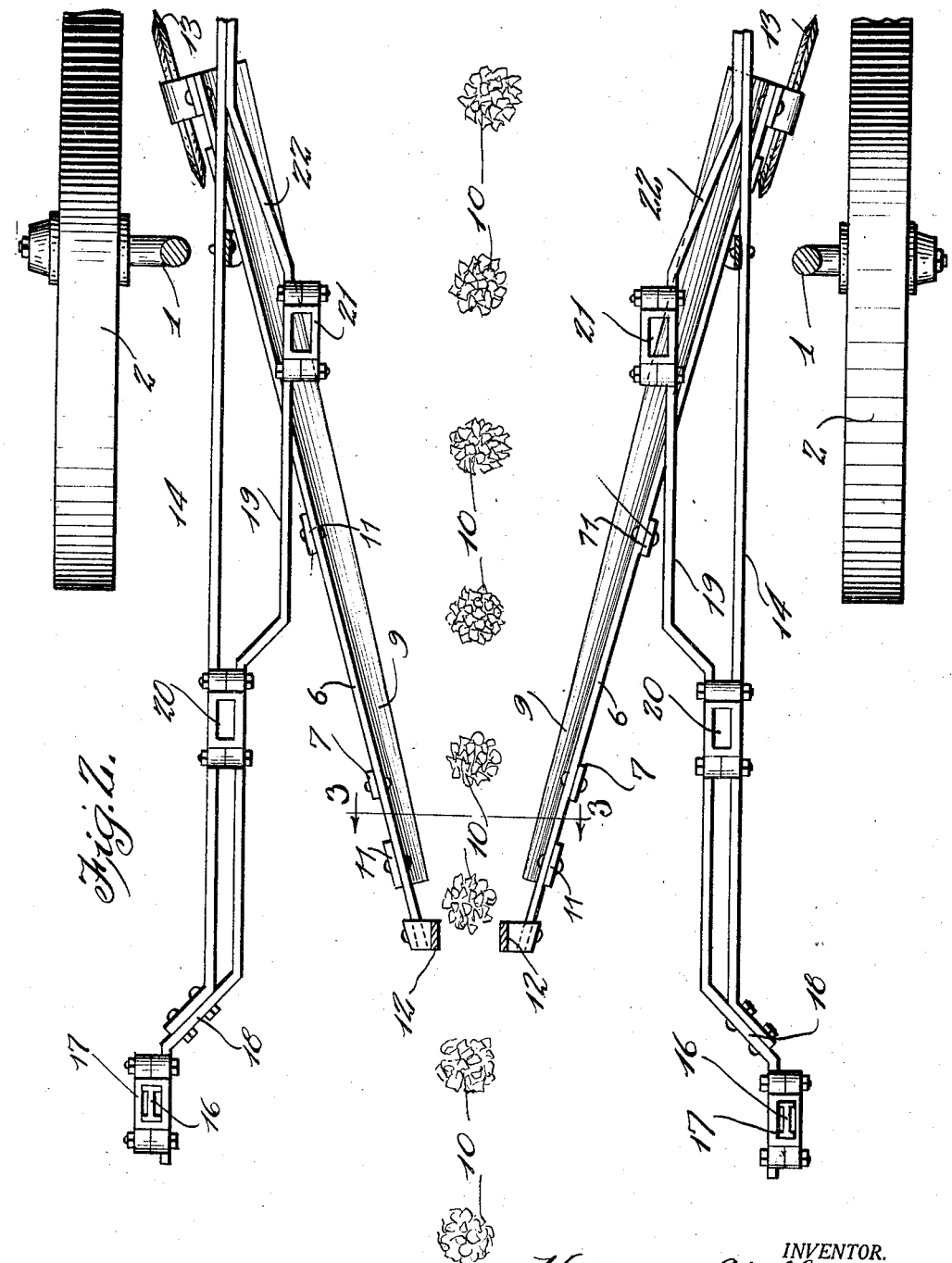

1,814,345

UNITED STATES PATENT OFFICE

HERMAN STEFFENS, OF CONCORDIA, MISSOURI

CULTIVATOR

Application filed December 27, 1927. Serial No. 242,682.

This invention relates to certain new and useful improvements in cultivators and it has for its objects among others to provide a simple, efficient cultivator designed to work very much on the order of a road grader, and one which will leave no weeds or water grass in the cornfield.

It has for a further object to provide a cultivator in which the blades will work to better advantage early in the season, in the wet season, for instance, where shovels are apt to cover-up too much of the corn. I employ blades that serve to just shave off the weeds without throwing too much soil up on the corn.

The present invention has for a further object to provide blades and shovels and rolling cutters ahead of the blades for use in the field where there are morning-glories or the like.

Other objects and advantages of the invention will hereinafter appear and the novel features thereof will be particularly pointed out in the appended claim.

The invention, in its preferred form, is clearly illustrated in the accompanying drawings, which, with the numerals of reference marked thereon, form a part of this specification, and in which Figure 1 is a side elevation of a cultivator embodying my present improvements.

Figure 2 is a section on the line 2—2 of Figure 1, looking in the direction of the arrows.

Figure 3 is a vertical cross section on the line 3—3 of Figure 2, looking in the direction of the arrows parts being omitted for the sake of clearness.

Like numerals of reference indicate like parts throughout the different views.

Referring to the drawings, 1 designates the axle, 2 the wheels, 3 the draft beam, 4 the seat and 5 the seat-supporting member, all of which may be of any well-known or approved form of construction. In fact, my improvement may be applied to practically any form of cultivator by removing the shovels and the like and applying my improvement in lieu thereof. Such parts of the cultivator, therefore, as are well-known and to which my improvement is applied require no detailed description.

6 are longitudinally extended members to which are secured the depending members 7, as seen in Figure 1, and these members 6 may be supported in any suitable manner, as upon the cutters 13 soon to be described, and carried by these depending members are the blades 8 which are crimped or have their lower edges curved or turned inward, as seen at 9, Figures 1 and 2 as well as Figure 3, in order to throw the dirt in toward the corn rows seen at 10 in Figure 2. The more the crimp or the greater the curvature of the lower edges of these blades 9, the better they cut. They are well adapted for potato planting to cover the hills and do as good work as can be done with hoes. These blades are crimped or curved at both edges and can be used on either side of the cultivator. 11 are shanks attached to the members 6 in any suitable manner and at their lower ends carry shovels 15, as seen clearly in Figure 1. These shovels are preferably vertically adjustable, as seen in Figure 1, for an obvious purpose. As seen clearly in Figure 2, the blades 8 are set at an angle to each other, being farther apart at the forward ends and at their rear ends approaching toward each other, the rear ends being disposed at any desired distance apart.

At the forward end of each of the blades 8 is mounted a circular cutter 13, see Figures 1 and 2.

14 are beams, one upon each side of the cultivator, and in the rear ends of these may be carried shovels 15, the shanks 16 of which are held in the sockets or the like 17 in the offset portions 18 of the beams 14, see particularly Figure 2.

Each of the beams 14 is braced by the members 19, at the junction of which members 14 and 19 intermediate their ends are provisions, as shown at 20, for the attachment of other shovels, not shown, if desired. When desired, other shovels may be attached in the sockets 21, shown in Figure 2, but any or all of these shovels may be omitted, as may be desired, such as are necessary only being employed.

Angular braces 22, seen best in Figure 2, serve to strengthen and brace the members 14 and 19.

The rolling cutters 13 may be of any well-known or approved form.

Parts of the cultivator herein shown and not described, such, for instance, as the levers 23 and their connections, may be of any well-known form and may be those of a cultivator of well-known construction to which latter the present improvements are applied.

In use, the blades elevate the dirt toward the corn, they leave no weeds in the cornfield, the blades work ahead of the shovels as will be evident, and one or two shovels may be used to the rear of the blades or the shovels may be omitted entirely. The rolling cutters may be omitted under some circumstances, but are desirable in cases where there are morning-glories or the like, but under other conditions the blades leave no weeds or grass as they cut them, and the cutters may be used alone and the blades also work without the shovels.

In practice, the blades may be from say eight to twelve inches in width. One or two shovels may be used to the rear of the blades to loosen the dirt and a small cutter in front of the blades to cut morning-glories and the like. The shovels will serve to loosen the dirt and the blades serve to elevate the dirt toward the corn or by reversal of the blades they will throw the dirt away from the corn.

Modifications in detail may be resorted to without departing from the spirit of the invention or sacrificing any of its advantages.

What is claimed as new is:—

In a cultivator, a wheel supported-frame, a seat-supporting member extending rearwardly therefrom, bars depending from said member and carrying longitudinally-extending rearwardly convergent bars, and hilling blades attached to said last-mentioned bars in spaced parallel vertical relation, said blades being crimped inwardly to provide a scraping edge.

In testimony whereof I affix my signature.

HERMAN STEFFENS.